July 1, 1924.

R. J. ANDERSON

STORAGE BATTERY CELL

Filed June 5, 1922 2 Sheets-Sheet 1

1,499,901

INVENTOR
ROBERT J. ANDERSON

By Paul & Paul
ATTORNEYS

INVENTOR
ROBERT J. ANDERSON

Patented July 1, 1924.

1,499,901

UNITED STATES PATENT OFFICE.

ROBERT JAMES ANDERSON, OF MINNEAPOLIS, MINNESOTA, ASSIGNOR TO CHARLES HENRY WASHBURN, OF MINNEAPOLIS, MINNESOTA.

STORAGE-BATTERY CELL.

Application filed June 5, 1922. Serial No. 565,816.

*To all whom it may concern:*

Be it known that I, ROBERT J. ANDERSON, a citizen of the United States, resident of Minneapolis, county of Hennepin, and State of Minnesota, have invented certain new and useful Improvements in Storage-Battery Cells, of which the following is a specification.

This invention relates to new and useful improvements in a cell for electric secondary or storage batteries, and more particularly relates to such cells employed in conjunction with liquid electrolyte.

The capacity of storage cells or batteries is measured in ampere hours and the charge and discharge rate varies substantially according to the surface area of positive surface exposed to the action of the electrolyte. In present forms of such cells, the lead plate is in most general use. The negative plate is composed of lead sponge supported by a grid of pure lead, and the positive plate consists usually of lead peroxide in a similar manner. The attainment of large output necessitates large plate surfaces which in turn entails excessive weight.

In this improved cell the active material is so treated that an equal weight of material provides a greatly increased surface exposure to the action of the liquid electrolyte with the resultant increase of amperage output. In accordance with this invention, the active materials are broken up into small particles such, for example, as of granular form. The negative material is placed in one compartment while the positive material is placed in a separate compartment, the two compartments of a cell being so constructed and held that the electrolyte may freely move from one compartment to the other without movement of the granular materials. Thus, both the positive and negative material particles are fully surrounded with the electrolyte and free circulation thereof is provided so that greatly increased area is exposed for electrolytic action and the amperage output of the cell is augmented.

Broadly considered, each cell is provided with an interior wall or separator dividing the cell into two compartments within one of which is contained the negative particles while the other holds the positive particles. The wall or separator is preferably freely pervious so that the liquid electrolyte may readily pass from one compartment to the other. These pervious partitions may be of wood or rubber sheets with many small apertures or perforations, asbestos wool or cloth prepared in a manner suitable to give porosity to the partition to permit the desired passage of the electrolyte. The particles in the two compartments are held in mutually insulated position by forming the cell casing and the partition of insulating material. A conductor is introduced into each compartment in contact with the respectively contained mass of particles and a binding post may be connected to each such conductor and thus provide the terminals for the cell.

The object therefore of this invention is to provide an improved secondary or storage cell.

A further object of this invention is to provide a cell having a much higher amperage output than can be obtained from cells in use at the present time of equal weight and size.

A still further object is to provide a cell of very light and simple construction and of high efficiency.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown as various changes may be made within the scope of the claims which follow.

Figure 3:
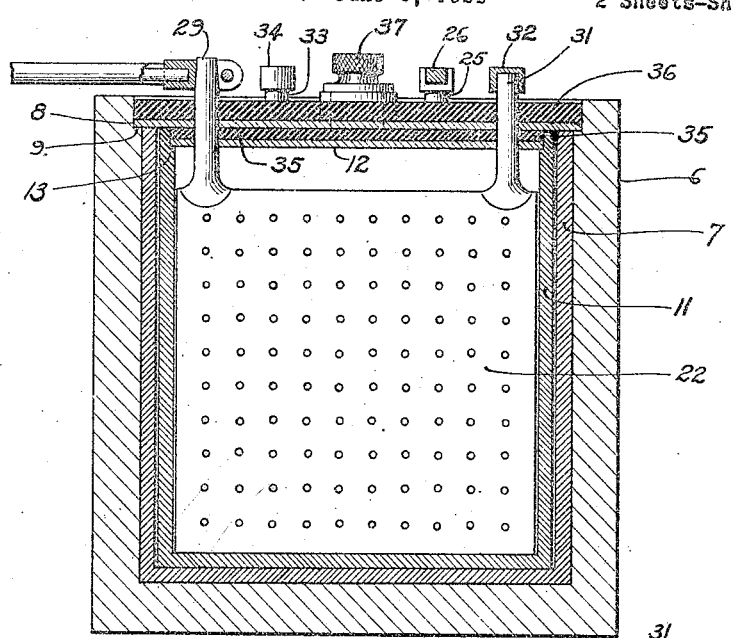
Figure 3 is a transverse sectional view on the line 3—3 of Figure 2 showing one of the positive grids.
Figure 4:
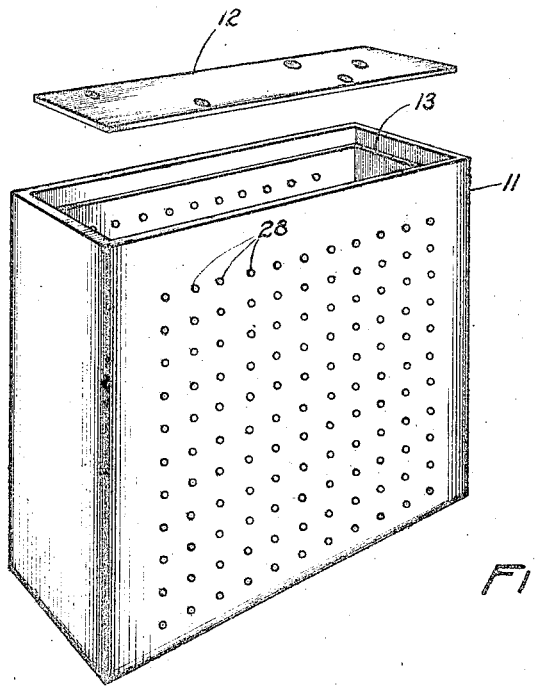
Figure 4 is a perspective view of one of the cell casings and the cover for same.

While a single cell of this improved type may be employed, it is customary in this art to employ two or more cells to constitute a battery. And, for purposes of clear explanation of this invention, there are here shown two of the novel cells so employed. The housing 6, which is preferably of wood is adapted snugly to receive a container 7 provided with a cover plate 8 which rests upon the upper edge of the container and also upon an upwardly presented shoulder 9 formed by cutting away the inner faces of the upper portions of the walls of the housing as is shown in Figure 3. This cover plate 8 not only functions to close the container but also to close the housing. The container and cover plate may be made of any suitable non-conducting material such as hard-rubber, glass, etc., hard-rubber being preferably employed.

Figure 5:
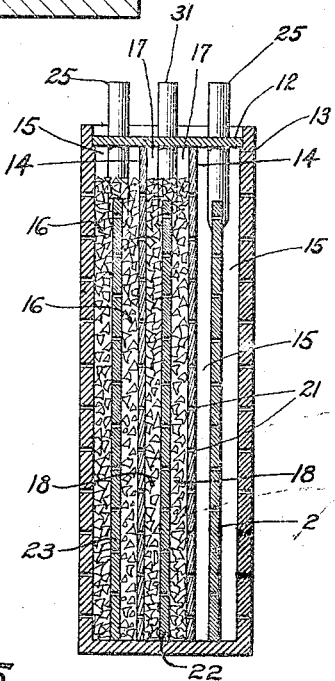
Figure 5 is a transverse sectional view of an assembled cell showing the different elements in their relative places.

While one or more of the novel cells may be employed to constitute this improved battery, there are here shown two such cells which are placed in spaced relation within the container 7. The cells are similar and each consists of a casing 11 having a cover 12 adapted to be seated upon a ledge 13 integrally provided adjacent the upper edges of the casing walls by interiorly cutting away a portion of each casing wall. Each cell is substantially separated into three compartments by two perforated partitions or separators 14. These separators may be formed of any suitable non-conducting material such as wood or hard-rubber. A pair of these separators is placed, as shown in Figure 5, within a casing 11 with their lower edges resting upon the bottom of the casing and extending upwardly to the horizontal plane of the ledge 13. Hence, when the cover 12 is positioned, it not only rests upon the ledge 13 but also upon the upper edges of the two spaced separators.

The materials used in connection with the negative and positive sides of the cell may be any of those commonly used and may be here termed the negative material and the positive material, but in accordance with this invention these materials are employed in comminuted form, such as small particles or granules which form may be termed granular for convenience of reference. The two outer compartments 15 are substantially filled, as indicated in the drawings, with the negative granular material 16 while the middle compartment 17 is similarly filled with the granular positive material 18. Liquid electrolyte 19 of a kind adapted for use with the selected negative and positive materials is poured within the cell casing 11. The two separators 14 here shown are of wood each having a plurality of perforations 21 to permit free passage and circulation of the electrolyte from and to the three compartments. Means are introduced within each of the three compartments to effect contact with the granular material and while such means may be of various types, they are here shown as pervious grid plates of lead resting upon the bottom of the casing. The positive grid 22 is positioned within the middle compartment while the negative grids 23 and 24 are respectively positioned within the two outer compartments 15.

Figure 1:
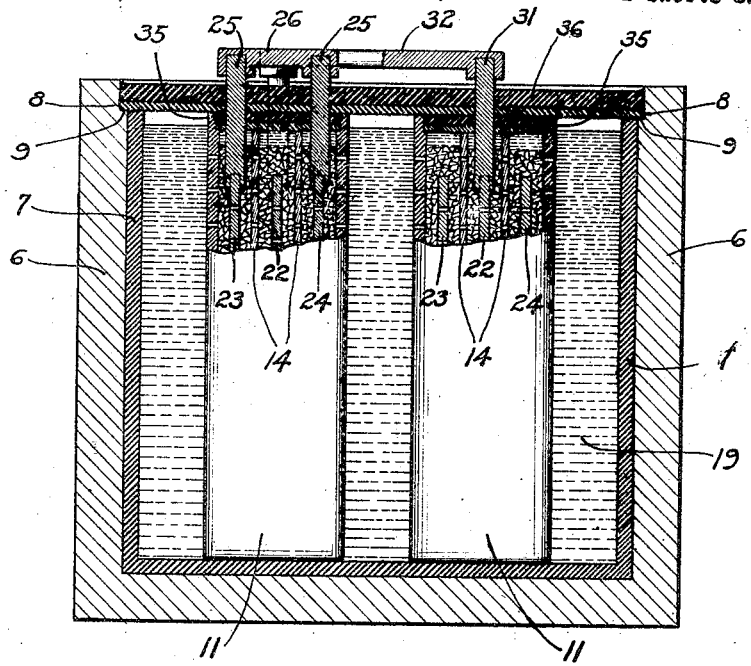
Figure 1 is a partial sectional view on the line 1—1 of Figure 2 showing a storage battery comprising two cells.
Figure 2:
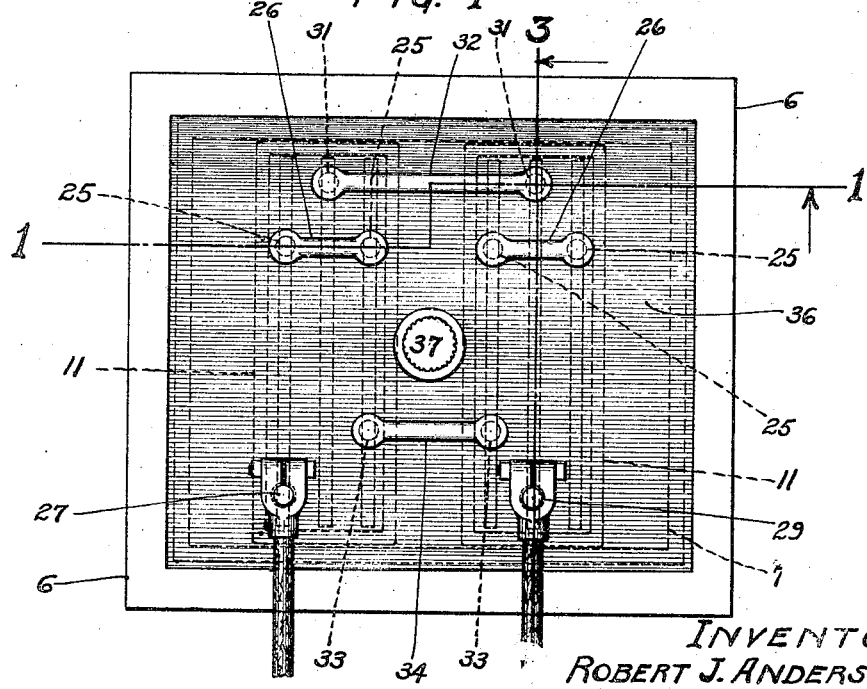
Figure 2 is a plan view of the same showing the method of connecting the positive and negative grid plates of the two cells.

A post 25 is electrically connected to each of the outer grids (see Figure 2) and, projecting through the cell cover 12 are electrically joined by a connector 26. A terminal post 27 is connected to one of the negative grids and, if a cell is singly employed, another post may similarly be connected to the middle or positive grid. However, as here shown, two novel cells are shown as joined to constitute a battery. In such case, the side walls of each cell 11 have a plurality of perforations 28 as best shown in Figure 1. Preferably these perforations bear a staggered relation to each other and thus the electrolyte held within the housing 6 may freely circulate through all compartments of both cells. Furthermore, when employed as a battery, all grid posts project through both the cell covers 12 and the housing cover plate 8. In such battery connection, the other terminal post 29 is connected to the positive grid of the other cell and the two positive grids are provided with upwardly projecting posts 31 joined by an electrical connector 32. The outer negative grids of each cell are thus joined together by connectors 26 and the adjacent negative grids of adjacent cells are provided with binding posts 33 which are electrically joined by a connector 34.

Each individual cell is preferably sealed, after emplacement of both materials and the three grids, preferably by pouring a sealing compound 35 of any suitable material such as tar or asphalt, over the cover top thus not only hermetically sealing the cover in place but also closing any space around the stems of the posts which project through the cell cover, as above noted. Likewise, the housing cover plate 8 is similarly sealed by the compound 36. A common form of filler cup 37 is provided for the filling and replenishment of the liquid electrolyte.

I claim as my invention:

1. A secondary cell having a casing of insulating material adapted to contain a liquid electrolyte, a cover therefor, partitioning means of insulating material extending from the casing base to the cover to separate the casing into covered compartments, said partitioning means being pervious to permit circulation of the electrolyte, positive material in one compartment and negative material in the other compartment whereby the two materials are insulated from each other and the electrolyte may freely circulate therebetween, the positive material being in loosely divided form whereby a relatively large surface is presented to the electrolyte, a grid means extending into each compartment in engagement with the contained material, and a cell terminal provided by each grid means.

2. A secondary cell having a casing of insulating material adapted to contain a liquid electrolyte, a cover therefor, partitioning means of insulating material extending from the casing base to the cover to separate the casing into covered compartments, said partitioning means being pervious to permit circulation of the electrolyte, positive material in one compartment and negative material in the other compartment whereby the two materials are insulated from each other and the electrolyte may freely circulate therebetween, both said materials being in loosely divided form whereby relatively large surfaces of the materials are presented to the electrolyte, a grid means extending into each compartment in engagement with the contained material, and a cell terminal provided by each grid means.

3. A secondary cell having a casing of insulating material adapted to contain a liquid electrolyte, a cover therefor, partitioning means of insulating material extending from the casing base to the cover to separate the casing into covered compartments, said partitioning means being pervious to permit circulation of the electrolyte, positive material in one compartment and negative material in the other two compartments whereby the materials are insulated from each other and the electrolyte may freely circulate therebetween, all said materials being in loosely divided form whereby relatively large surfaces of the materials are presented to the electrolyte, a grid means extending into each compartment in engagement with the contained material, means electrically to connect the two grids in engagement with the negative material, and cell terminals provided by the positive grid and one of the negative grids.

4. A secondary cell having a casing of insulating material adapted to contain a liquid electrolyte, a cover therefor, a partition of insulating material extending from the casing base to the cover to separate the casing into covered compartments and pervious to permit circulation of the electrolyte, positive material in one compartment and negative material in the other compartment whereby the two materials are insulated from each other and the electrolyte may freely circulate therebetween, both said materials being in granular form whereby relatively large surfaces of the materials are presented to the electrolyte, grid means extending into each compartment in engagement with the contained material, and a cell terminal provided by each grid means.

5. A secondary cell having a casing of insulating material adapted to contain a liquid electrolyte, a cover therefor, a partition of insulating material extending from the casing base to the cover to separate the casing into covered compartments and pervious to permit circulation of the electrolyte, positive material in one compartment and negative material in the other compartment whereby the two materials are insulated from each other and the electrolyte may freely circulate therebetween, both said materials being in granular form whereby relatively large surfaces of the materials are presented to the electrolyte, grid plates extending into each compartment in engagement with the contained material, said plates being perforated to permit the circulation of electrolyte therethrough, and a cell terminal provided by each grid plate.

6. A secondary cell having a casing of insulating material adapted to contain a liquid electrolyte, partitioning means of insulating material to separate the casing into compartments, said partitioning means being pervious to permit circulation of the electrolyte, positive material in one compartment and negative material in the other compartment whereby the two materials are insulated from each other and the electrolyte may freely circulate therebetween, the positive material being in loosely divided form whereby a relatively large surface is presented to the electrolyte, a grid means extending into each compartment in engagement with the contained material, a cell terminal provided by each grid means, and said cell casing being perforate whereby a plurality of said cells may be positioned within an imperforate battery housing containing electrolyte whereby the electrolyte may pass to each compartment of each cell.

In witness whereof, I have hereunto set my hand this 26th day of May 1922.

ROBERT JAMES ANDERSON